United States Patent [19]

Lybarger

[11] 3,998,269

[45] Dec. 21, 1976

[54] PLUGGING A SUBTERRANEAN RESERVOIR WITH A SELF-SEALING FILTER CAKE

[75] Inventor: James H. Lybarger, Metairie, La.

[73] Assignee: Shell Oil Company, Houston, Tex.

[22] Filed: Oct. 10, 1975

[21] Appl. No.: 621,264

[52] U.S. Cl. .............................. 166/250; 166/295
[51] Int. Cl.² ...................................... E21B 33/138
[58] Field of Search ........................... 166/295, 250

[56] References Cited

UNITED STATES PATENTS

| 2,356,302 | 8/1944 | Chapman | 166/295 UX |
| 2,556,169 | 6/1951 | Crouch et al. | 166/295 |
| 2,570,892 | 10/1951 | White | 166/295 X |
| 2,986,538 | 5/1961 | Nesbitt et al. | 166/295 X |
| 3,208,525 | 9/1965 | Caldwell et al. | 166/295 |
| 3,241,613 | 3/1966 | Kern et al. | 166/295 X |
| 3,316,966 | 5/1967 | Dear, Jr. | 166/295 |
| 3,724,549 | 4/1973 | Dill | 166/295 X |
| 3,830,299 | 8/1974 | Thomeer | 166/250 |
| R23,393 | 7/1951 | Kurtz, Jr. et al. | 166/295 |

Primary Examiner—Stephen J. Novosad
Assistant Examiner—George A. Suchfield

[57] ABSTRACT

A subterranean reservoir is plugged by injecting a suspension containing solid particles of a resin capable of softening and resolidifying at the reservoir temperature. The particle sizes are correlated with the reservoir pore sizes so that particles are screened-out within and along the face of the reservoir formation. And, the particle compositions are correlated with the reservoir temperature so that the screened-out particles in and along the reservoir formation become fused into a substantially impermeable layer.

8 Claims, 2 Drawing Figures

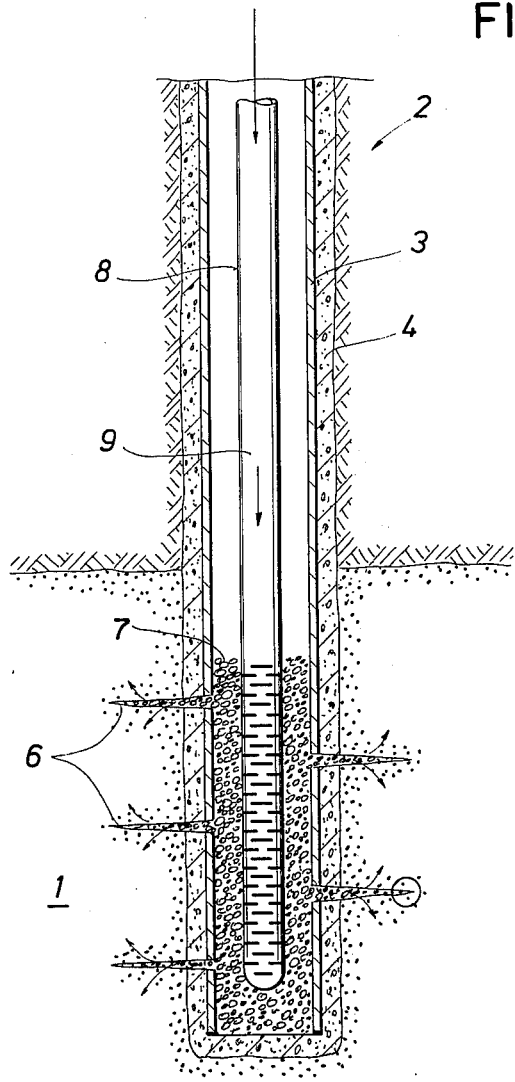
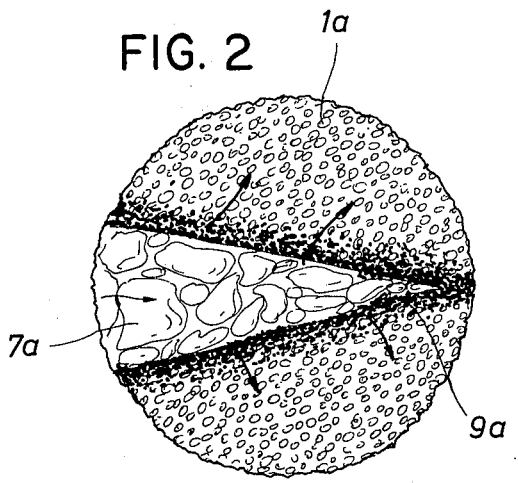

PLUGGING A SUBTERRANEAN RESERVOIR WITH A SELF-SEALING FILTER CAKE

BACKGROUND OF THE INVENTION

The invention is a well-treating process for plugging a permeable subterranean earth formation. It is particularly suited for plugging earth formations located behind sand or gravel packs, or behind a section of cemented or grouted casing along which there is fluid communication through or behind the cement or the grout.

The value of plugging permeable subterranean earth formations and numerous methods for doing so have long been known. For example, plugging procedures (using cements, plastics, etc.) were described in the 1946 edition of "Petroleum Production Engineering Oilfield Development" by L. C. Uren, published by the McGraw Hill Book Company, Inc. More recently, the value of plugging such formations by forming a relatively impermeable sheath within the first few inches of the formations was described (in the J. H. Thomeer U.S. Pat. No. 3,830,299, discussed below).

Numerous procedures have been developed for injecting suspensions of solid or substantially solid particles into permeable subterranean formations to form relatively deeply penetrating, or shallowly penetrating, deposits of permeability-reducing materials within the formations. For example, U.S. Pat. No. 3,749,171 relates to injecting suspended particles and teaches that where the largest particle size is less than the median pore size of a reservoir formation, most of the suspension will flow through the formation for a considerable distance. U.S. Pat. No. 3,762,475 relates to injecting a suspension of starch granules and teaches that suitable sizes and concentrations include sizes of 4–6 microns in diameter and concentrations of 1,000–5,000 parts per million. U.S. Pat. No. 3,785,438 relates to first injecting a suspension of bridging particles of an oil-soluble resin material and then injecting a suspension of a colloidal additive, e.g., a lignosulfate complexed with a trivalent cation and divalent base, to seal the filter cake formed by the bridging particles. U.S. Pat. No. 3,827,498 relates to forming suspensions of particles to be used as diverting agents and teaches that about 75% of a batch of particles having a maximum diameter of 44 microns will pass through a borehole gravel pack of grains of 20–40 standard mesh size.

The J. H. Thomeer U.S. Pat. No. 3,830,299 relates to adjusting the permeability profile of a subterranean reservoir interval by forming a shallow plug within the first few inches of all of the permeable formations and then perforating at selected depths to provide selected rates of flows at those depths. It teaches that in an earth formation having a permeability of about 50 millidarcies and a mean pore size of about 20 microns, significant plugging within the first few inches is provided by injecting a suspension of particles of which about 5 parts are generally less than 12 microns in diameter and about 1 part are primarily within the 1–10 micron range.

SUMMARY OF THE INVENTION

The present invention relates to a well-treating process for plugging a permeable subterranean earth formation. Particles of a solid resin which softens and solidifies at the temperature of the earth formation to be plugged are suspended in a liquid. The particle sizes are correlated with the reservoir pore sizes so that, when the suspension of the particles is injected into the formation, particles are deposited on the face and within the first few inches of the face. The composition of the particles is correlated with the temperature of the earth formation so that particles deposited on and in the formation become fused into a substantially impermeable layer. The suspension is then injected into the earth formation so that the particles are so deposited.

DESCRIPTION OF THE DRAWING

FIGS. 1 and 2 are schematic illustrations of a portion of a well and reservoir being treated by the process of the invention.

DESCRIPTION OF THE INVENTION

The present invention involves the following discovery. The compositions of one or more solid resinous materials can be arranged so that the particles can be suitably sized, fluid transported, deposited in and along the face of a permeable subterranean earth formation, and there fused into a substantially impermeable layer that plugs and strengthens the formation. This is a uniquely advantageous plugging procedure. Relative to injecting a solution that solidifies within the formation, it is economical because it requires a relatively small amount of the plugging material. Relative to first forming a filter cake by injecting suspended bridging materials and then sealing the cake by injecting a suspended colloidal additive, it is simpler and cheaper because it forms a substantially impermeable plug in a single treatment step. Yet, present use of a self-sealing filter cake retains the advantage that, if it should become desirable to re-establish communication with the plugged formation, the shallow plugged layer can be readily perforated with tools and techniques that are currently available.

Known types of resinous materials are suitable for use in the present process. They are commonly called "thermoplastic-thermosetting" resins or "B-stage" resins (referring to their residual reactivity). Such resins may be formed from epoxy, phenol-formaldehyde, alkyd, or glyptal, or the like resin-forming materials. For example, U.S. Pat. Nos. 2,981,344 and 2,986,538 describe such B-stage resins. In those patents such resins are used to coat gravel pack particles with a solid layer which, when the coated particles have been strained out against a subterranean reservoir formation, will soften and resolidify to bind the particles into an integral permeable structure. In the present process, particularly suitable B-stage resins are prepared by polymerizing a mixture of a polymerizable polyepoxide and a compound containing a plurality of aromatic amino groups, e.g., a mixture of EPON 828 and curing agent Z or curing agent MPDA (i.e., mixtures of polyepoxides and, as curing agents, diamine or methylenedianiline; available from Shell Chemical Company).

The effective sizes of the pores of a subterranean earth formation can be determined in numerous ways. They are commonly determined from logging and/or coring measurements made during or after the drilling and completing of a well. The effective pore sizes of a formation to be treated are generally indicated by the permeability of the formation. As known to those skilled in the art, if the sizes of particles suspended in a fluid being injected into an earth formation are generally less than the effective diameters of the pores but include a significant portion of particles equaling at least about ⅓ of the effective pore sizes, a significant amount of the particles will penetrate into the formation and will be deposited within the first few inches from its face.

In correlating the sizes of the suspended particles used in the present invention with the sizes of the pores in the earth formation to be treated, conventional techniques and equipment can be utilized. The particle sizes can readily be measured by standard screen analysis. The sizes to be used can be determined from calculations based on logs or other determinations of the earth formation pore sizes. And, laboratory tests of selected formulations can be made by injecting suspensions into cores or gravel packs simulating the materials to be encountered or treated in the well. Where the formation to be plugged is located behind a gravel pack, the sizes of the suspended particles should be arranged so that most, if not all of the particles, are carried through the gravel but are screened out in and along the formation.

The rate at which particles of a B-stage resin will soften and resolidify (so that they become fused together) at a given temperature is strongly influenced by the composition of the resin. As known to those skilled in the art, key factors in the composition of a resin comprise the composition of the polymerizable materials and curing agents and the extent of their dilution with an inert solvent. In the present process, the preferred mixtures of polymerizable polyepoxides and amine curing agents tend to soften within times such as about 4–24 hours at temperatures at from about 120°–180° F. The rate of their recuring can be slowed by diluting them with relatively non-volatile solvents (which tend to remain in solid solution in the B-stage resin), and/or using relatively high molecular weight epoxy monomers, etc. That rate can be accelerated by reducing the dilution of the reactants and/or including heat-activated curing agents (e.g., a sulfonic acid salt of an amine of the type described in the H. Dannenburg U.S. Pat. No. 2,786,397), etc. In the present process, the resin composition is preferably arranged so that, at the temperature of the reservoir to be treated, the softening and fusing of particles of the resin will occur within from about 6–12 hours.

The resins used in the present process can advantageously contain relatively small proportions of silanes or other silicon compounds that tend to function as bonding agents for increasing the bond strength between the resinous materials and solids such as sand grains. Examples of suitable silicon compounds include the hydroxy or amino group-containing silanes described in the T. F. Mika U.S. Pat. No. 2,843,560, or those described in U.S. Pat. No. 3,150,116. Such silicon compounds include the aminopropyl triethoxy silanes, such as gamma-aminopropyl triethoxy silane available from Union Carbide under the name SILANE A-1100, the epoxy group-containing epoxy alkyl silane esters such as a beta-(3,4-epoxycyclohexyl) ethyl trimethoxy silane available from Union Carbide as SILANE A-186. The amino-functional silanes, such as the A-1100, are particularly effective. For example, their use may cause a 10-fold increase in the compressive strengths of resin-bonded sand grains.

The resins used in the present invention can also contain additives, such as fillers, diluents, plasticizers, stabilizers, etc., commonly used in the forming of solid B-stage resins. Where the earth formation pore sizes are relatively large, and/or long intervals of earth formations are to be treated, fillers, such as finely-divided silica, calcite, iron oxide, titanium oxide, or the like, can advantageously be used. The particle sizes of such filler materials (for convenience, referred to as "sand" particles) should be at least about as small as those of the B-stage resin particles. The sand-to-resin ratio should be kept low enough to avoid a formation of a permeable integral structure of resin-bonded sand grains. The proportion of such filler material is preferably kept below about equal portions by volume.

The B-stage resins can be comminuted or ground or flocculated into fine particles by procedures such as those known in the art. Where a filler material is used it is preferably coated with the B-stage resin or mixture of resin-forming components in a liquid state. After the coatings have solidified, the mixture of solid filler and resin are comminuted into the fine particles to be used. When cured at normal ambient temperatures the preferred resins are stable for a period of at least several weeks. The comminuted particles are preferably formed and size-graded at a central location to provide batches of different sizes that can be combined as needed to provide the size range selected for use in the field.

In general, the particle-suspending liquid used in the present process can be substantially any liquid which is relatively inert to the suspended particles and to the permeable earth formation to be treated. A relatively soft aqueous saline solution is preferred. However, where desired, the suspending liquid can be an aqueous liquid or oil-phase liquid or an emulsion of the two.

Where desirable, for example for suspending a relatively high concentration of the resin particles in a liquid, the viscosity of the carrier liquid can be increased by adding a viscosity-enhancing material. In an aqueous liquid such a material can be a water-soluble cellulose ether such as hydroxyethyl cellulose, carboxymethyl cellulose, or the like. In an oil-phase liquid a relatively viscous oil, and/or fatty acid soap, or the like, can be used as a viscosifier. Where the viscosifier used includes a self-breaking reactant, the reactant should be one which is inert to the polymer. For example, in a hydroxyethyl cellulose-thickened aqueous solution, an acid or acid-forming material provides a suitable self-breaking reactant but, in the present process, the acid may alter the timing, or interfere with, the softening and fusing of the resin particles.

In general, the proportion of suspended B-stage resin particles, or of the resin and filler particles in the carrier liquid can be varied widely. Generally, relatively small concentrations of suspended particles in the suspending liquid, carrier liquid, are suitable. Preferred concentrations comprise from about 1–10 pounds per gallon. With a preferred concentration, in an aqueous carrier liquid, a viscosifier is seldom needed. The density of the carrier liquid can readily be adjusted by dissolving neutral salts, e.g., alkali metal or alkaline earth metal halides, and/or ammonium chloride, in amounts sufficient to cause the density of the carrier liquid to become substantially equal to the density of the suspended particles.

The drawing schematically illustrates a use of the present process. It shows a permeable subterranean reservoir 1 encountered by the borehole of a well 2. The well contains a casing 3 surrounded by a sheath of cement 4. The casings and cement have been pierced by perforation tunnels 6. A gravel pack 7 has been formed around perforated conduit 8.

As shown, a resin particle slurry 9 is being injected so it flows through the gravel pack and into the reservoir. As indicated, the whole of the resin particle slurry flows between the gravel pack particles 7a, with the carrier liquid flowing between the reservoir formation sand grains 1a while leaving a resin particle filter cake 9a (of particles screened out of the slurry) on and within the near-face portion of the reservoir formation.

Such a resin particle slurry is preferably an aqueous liquid suspension of particles predominating in a B-stage resin of the preferred type described above. The carrier liquid preferably contains enough dissolved salt to provide a density substantially equaling the density of the suspended particles. The volume of the slurry-preceding slug of equally dense fluid is preferably sufficient to fill the borehole section containing the perforations. The volume of the resin-particle slurry is preferably at least sufficient to form a resin-particle filter cake 9a in and along the portions of reservoir formation 1 that are exposed along the borehole and/or perforation tunnels 6 of the well.

The pressures of the fluids in the bottom of the well are preferably kept slightly above the formation fluid pressure but below the reservoir fracturing pressure. As known to those skilled in the art, in treating a low pressure reservoir it may be desirable to circulate in the relatively dense fluid that precedes the resin particle slurry by allowing an outflow of fluid through the annular space between the casing 3 and the internal conduit 8. Where an undesirably high pressure overbalance would be created (by hydrostatic pressure) if a column of such fluid extends from the reservoir to the surface, a less dense fluid can be circulated within the annulus to spot only a short column of the denser fluid at the zone to be treated. During the injection of the resin particle slurry, the formation of a resin particle filter cake 9a tends to significantly reduce or substantially terminate the flow into the reservoir. When this occurs it may be desirable to allow an upflow of fluid in the annular space within the borehole. After forming a resin particle filter cake, the fluids in the well are preferably kept static while maintaining a significant, but not excessive, overbalance of fluid pressure (i.e., a borehole pressure exceeding the reservoir pressure). This ensures that the softening and fusing of the resin particles occurs while they are compressed into a substantially impermeable layer.

As known to those skilled in the art, the use of resin particle slurry-preceding and slurry-following solutions of substantially equal density are particularly desirable in treating wells that are free of gravel packs or have undergone multiple completions into different zones. In such treatments, the spotting of enough relatively dense solution to fill the interval to be treated before injecting the resin particle slurry ensures that the slurry will flow directly into the open perforations and into the reservoir formation. If, for example, the slurry were denser than the fluid in interval being treated, the slurry would tend to flow into the bottom of that interval while the lighter fluid was being displaced into the open perforations.

In the present process, after plugging the portion of the reservoir encountered by the perforation tunnels, the excess resin particle slurry can be circulated out of the interval being treated. New perforations can then be formed in a different portion of the same interval. Thus, the well can be re-completed into a different portion of reservoir formation without a need for removing replacing tubing.

Laboratory tests have been made regarding the strength of resins formed by softening and recuring of a B-stage resin in a manner equivalent to that used in the present process. To provide reproducible structures on which to conduct measurements a 20–40 mesh sand was coated with a B-stage resin (while the resin-forming material was liquid). The ratio of the sand to the resin was about 15:1. The resin used contained (in parts by weight) 100 parts EPON 818, 20 parts curing agent Z, and 1 part SILANE A-1100. The coated sand was spread into ¼–½ inch sheets. The B-stage cure was achieved at room temperature in about 20–22 hours. The sheets of coated sand were then broken into individual grains by passing them through rollers spaced at several grain diameters. After sieving to remove fine particles, the coated sand grains were immersed in the indicated curing mediums, so that they were compressed into packs of resin-coated grains, and allowed to cure.

The compressive strengths of the resulting resin-consolidated sand packs were measured after the softening and re-curing of the grain coating resins. In the curing mediums that were free of acid, the resin particles fused together to form resin-consolidated masses of significant strength.

TABLE

| Curing Medium | Compaction Loading PSI | Temp ° F | Compressive Strength PSI |
|---|---|---|---|
| 3% NaCl Brine | 0 | 120 | 2000 |
|  | 0 | 150 | 3000 |
|  | 0 | 180 | 2400 |
| Kerosene Wetted | 0 | 150 | 1300 |
| E. Bay Crude Wetting | 0 | 150 | 200 |
| Kerosene | 0 | 150 | 1300 |
| Hydroxyethyl cellulose thickened aqueous NH₄Cl solution |  |  |  |
| No Breaker | 0 | 150 | 130 |
|  | 100 | 150 | 3100 |
| 1M HCl Breaker | 100 | 150 | less than 100 |

What is claimed is:

1. A process for plugging a permeable subterranean earth formation, comprising:
   suspending particles of a solid resin capable of softening and resolidifying at the temperature of said earth formation in a relatively inert carrier liquid comprising a water solution of sodium chloride;
   correlating the sizes of the particles with the sizes of the pores of said earth formation so that, when the suspension is injected into the formation, the particles are screened out and deposited on the face of the formation and within the first few inches beyond its face;

correlating the composition of the particles with the temperature of the earth formation so that the particles deposited on and within the formation are capable of becoming fused into a substantially impermeable layer; and injecting the suspension into the earth formation so that the particles are so deposited and fused.

2. The process of claim 1 in which said carrier liquid contains enough dissolved salt to provide a density substantially equaling that of the suspended particles.

3. The process of claim 2 in which the injecting of said suspension is preceded by injecting an aqueous solution containing enough dissolved salt to provide a density substantially equaling that of the suspension.

4. The process of claim 1 in which a significant but relatively small bottom hole pressure overbalance is maintained during the injection of said suspension and the subsequent fusing of the deposited particles of resin.

5. The process of claim 1 in which solid particles of filler material are included in said suspension.

6. The process of claim 1 in which said re-solidifiable resin is a B-stage epoxy resin.

7. The process of claim 1 in which said resin contains a silane.

8. A process for plugging a permeable subterranean earth formation, comprising:

suspending particles of a solid resin capable of softening and resolidifying at the temperature of said earth formation in a relatively inert carrier liquid;

correlating the sizes of the particles with the sizes of the pores of said earth formation so that, when the suspension is injected into the formation, the particles are screened out and deposited on the face of the formation and within the first few inches beyond its face;

correlating the composition of the particles with the temperature of the earth formation so that the particles deposited on and within the formation are capable of becoming fused into a substantially impermeable layer;

injecting the suspension into the earth formation being treated through perforation tunnels that pierce a casing which is cemented within the section of the well being treated; and preceding the injection of the suspension by the injection of enough liquid having a density substantially equaling the density of the suspension to at least substantially fill the section of the well which contains the performance tunnels.

* * * * *